United States Patent [19]
Akiba et al.

[11] Patent Number: 5,910,937
[45] Date of Patent: Jun. 8, 1999

[54] OPTICAL PICKUP APPARATUS AND IDENTIFICATION APPARATUS FOR IDENTIFYING THE TYPE OF OPTICAL RECORD MEDIUM

[75] Inventors: Taichi Akiba; Akira Miura, both of Tokorozawa, Japan

[73] Assignee: Pioneer Electronic Corporation, Tokyo-To, Japan

[21] Appl. No.: 09/048,217

[22] Filed: Mar. 26, 1998

Related U.S. Application Data

[62] Division of application No. 08/595,196, Feb. 1, 1996, Pat. No. 5,757,742.

[30] Foreign Application Priority Data

| Feb. 2, 1995 | [JP] | Japan | ................................. | P7-016295 |
| Feb. 2, 1995 | [JP] | Japan | ................................. | P7-016297 |

[51] Int. Cl.⁶ ........................................... G11B 7/00
[52] U.S. Cl. ..................... 369/58; 369/44.24; 369/44.27; 369/118
[58] Field of Search ............................. 369/44.23, 44.24, 369/44.27, 44.29, 54, 58, 112, 118

[56] References Cited

U.S. PATENT DOCUMENTS

| 5,042,020 | 8/1991 | Endo ....................................... | 369/58 X |
| 5,541,900 | 7/1996 | Ito et al. ................................ | 369/58 X |
| 5,729,510 | 3/1998 | Kasahara et al. ....................... | 369/58 X |

FOREIGN PATENT DOCUMENTS 0 452 953  10/1991  European Pat. Off. .
0 470 807   2/1992  European Pat. Off. .
0 516 906  12/1992  European Pat. Off. .

OTHER PUBLICATIONS

Patent Abstracts of Japan, vol. 12, No. 140, (P–696), Apr. 28, 1988, & JP 62–262,019.

*Primary Examiner*—W. R. Young
*Attorney, Agent, or Firm*—Morgan, Lewis & Bockius LLP

[57] ABSTRACT

An optical pickup apparatus for an information reproducing apparatus is adapted to reproduce one of at least first and second type optical record media which is loaded on the information reproducing apparatus. The first and second type optical record media have distances from surfaces to information record planes different from each other. The optical pickup apparatus is provided with: a light emission device for emitting a reading light; an objective lens for focusing the emitted reading light onto the information record plane of the loaded one of the first and second type optical record media such that a focus condition of the focused reading light is optimum with respect to the first type optical record medium; a correction device for correcting a spherical aberration of the focused reading light with respect to the second type optical record medium due to a difference in the distances from the surfaces to the information record planes between the first and second type optical record media when the second type optical record medium is loaded; and a light receiving device for receiving a reflection light of the focused reading light from the information record plane of the loaded one of the first and second optical record media.

7 Claims, 16 Drawing Sheets

FIG. 3

|  | | DISC TYPE | |
|---|---|---|---|
|  | | CD | DVD |
| ABERRATION CORRECTION ELEMENT | OUT OF OPTICAL PATH | AS IT IS | MOVE IN |
| | IN OPTICAL PATH | MOVE OUT | AS IT IS |

FIG. 5

| | | DISC TYPE | |
|---|---|---|---|
| | | CD | DVD |
| SWITCH CONDITION | LENS A | AS IT IS | TO LENS B |
| | LENS B | TO LENS A | AS IT IS |

OPTICAL PICKUP APPARATUS AND IDENTIFICATION APPARATUS FOR IDENTIFYING THE TYPE OF OPTICAL RECORD MEDIUM

This is a divisional of application Ser. No. 08/595,196, filed Feb. 1, 1996, now U.S. Pat. No. 5,757,742.

BACKGROUND OF THE INVENTION

1. Field of the Invention

The present invention generally relates to an optical pickup apparatus and an identification apparatus for identifying the type of optical record medium used for the optical pickup apparatus, and more particularly to an optical pickup apparatus for reproducing record information of optical record media of various types, which substrates have various thicknesses, which distances from their surfaces to their information record planes are different from each other or which information pits on record tracks have various sizes, and an identification apparatus for identifying the type of such an optical record medium.

2. Description of the Related Arts

There is a multi-disc player, which can reproduce a CD (Compact Disc) and a LD (Laser vision Disc) etc., as a reproducing apparatus able to reproduce a plurality of types of optical record media.

In this kind of multi-disc player, in order to realize an optical system optimum for each of the optical discs, which thicknesses, refraction coefficients, etc., of their disc protection layers or their disc substrates are different from each other, a plurality of optical pickup apparatuses, each of which is exclusive for one of the optical discs of various types, are provided and are selectively used in accordance with the loaded optical disc to be reproduced. Thus, the optimum reproduction operation can be performed with respect to each of various types of optical discs by one multi-disc player.

In this kind of multi-disc player, in case of identifying the types of optical discs which disc thicknesses are different from each other, a mechanical switch is provided so as to identify the type of the loaded optical disc on the basis of the fact that this mechanical switch is pressed or not by the loaded optical disc. Further, in case of identifying the types of optical discs which external shapes e.g. the external diameters are different from each other, an optical detection device such as a light sensor is equipped to detect the existence and non-existence of the reflection light reflected by the loaded optical disc.

However, since a plurality of optical pickup apparatuses, each of which is exclusive for one of the optical discs of various types, are equipped in the above mentioned multi-disc player, the size and cost of the apparatus is increased, which is a serious problem in the practical sense.

In order to overcome this problem, it may be proposed to use one optical pickup apparatus commonly for a plurality of optical discs of various types. However, once the thickness of the protection layer (substrate) is far off from the optimum thickness set for each of the optical pickup apparatus, a spherical aberration is generated in the focused light beam as the reading light beam at the information record plane of the optical disc, which is another serious problem to perform a precise reproduction operation.

More concretely, assuming that the wavelength of the reading light beam emitted from a laser diode is $\lambda$, the refraction coefficient of the protection layer of the optical disc is n, the difference between the actual thickness of the protection layer of the optical disc and the optimum thickness of the protection layer set for the optical pickup apparatus is $\Delta d$, and the numerical aperture of the objective lens is NA, the spherical aberration $W_{40}$ is expressed by a following expression (1).

$$W_{40} = \{(n^2-1)/8n^3\} * \Delta d * (NA^4/\lambda) \tag{1}$$

Thus, as the difference $\Delta d$ is increased, the spherical aberration $W_{40}$ is also increased and the signal quality of the read out signal of the optical pickup apparatus is degraded, which is the problem.

Further, the above mentioned mechanical or optical identification apparatus for identifying the type of the loaded optical disc cannot identify the type of the loaded optical disc, if the thicknesses and refraction coefficients of the optical discs are substantially same to each other but only the distances from the surfaces of the protection layers to the information record planes are different from each other. In this case, a complicated identifying operation such as a comparison of record formats etc., will be necessary.

More concretely, those identification apparatuses cannot differentiate a first optical disc of both sides recording type produced by bonding two discs each of which has a protection layer with 0.6 mm thickness, from a second optical disc of one side recording type, which has an external diameter same as the first optical disc and which has a protection layer with 1.2 mm thickness, which is the problem.

By the way, in the above mentioned optical pickup apparatus, the spot diameter of the reading light beam is set to be a value optimum for the size of the information pit of the optical record medium to be reproduced.

The spot diameter R of the reading light beam is proportional to the numerical aperture NA of the objective lens and the wavelength $\lambda$ of the reading light beam. Namely, the spot diameter satisfies a following expression (2).

$$R \, \lambda/NA \tag{2}$$

Therefore, in case of reproducing the optical record medium which has an information pit of relatively small size, in order to make the spot diameter R of the reading light beam smaller correspondingly, the numerical aperture NA of the objective lens is increased assuming that the wavelength $\lambda$ of the reading light beam is constant.

In other words, assuming that the wavelength $\lambda$ of the reading light beam is constant, as the numerical aperture NA is increased, the smaller information pit can be reproduced, while, as the numerical aperture NA is decreased, the larger information pit can be reproduced.

The numerical aperture NA of the objective lens has a peculiar value for each objective lens. Thus, the optical pickup apparatus, which is adjusted to be optimum with respect to a first information pit having a certain size, is not suitable for a second information pit having a size different from that of the first information pit. Therefore, the distortion will be generated in the reproduction signal if this optical pickup apparatus is used with respect to an optical record medium formed with the second information pit, which is a problem in this case.

In this manner, it is not possible for one optical pickup apparatus to reproduce optical discs which sizes of the information pits are different from each other. Even if the reproduction is performed in such a condition, the precise reproduction operation is not possible, which is the problem.

SUMMARY OF THE INVENTION

It is therefore a first object of the present invention to provide an optical pickup apparatus for an information reproducing apparatus, which can reproduce optical record media of different types.

It is a second object of the present invention to provide an identification apparatus for identifying the type of optical disc loaded on such an information reproducing apparatus.

The above mentioned first object of the present invention can be achieved by a first optical pickup apparatus for an information reproducing apparatus adapted to reproduce one of at least first and second type optical record media which is loaded on the information reproducing apparatus. The first and second type optical record media have distances from surfaces to information record planes different from each other. The first optical pickup apparatus is provided with: a light emission device for emitting a reading light; an objective lens for focusing the emitted reading light onto the information record plane of the loaded one of the first and second type optical record media such that a focus condition of the focused reading light is optimum with respect to the first type optical record medium; a correction device for correcting a spherical aberration of the focused reading light with respect to the second type optical record medium due to a difference in the distances from the surfaces to the information record planes between the first and second type optical record media when the second type optical record medium is loaded; and a light receiving device for receiving a reflection light of the focused reading light from the information record plane of the loaded one of the first and second optical record media.

According to the first optical pickup apparatus, the reading light is emitted by the light emission device. Then, the emitted reading light is focused onto the information record plane of the loaded optical record medium by the objective lens, such that a focus condition of the focused reading light is optimum with respect to the first type optical record medium. Thus, when the first type optical record medium is loaded, the optimum focus condition can be obtained without the necessity of the correction device for correcting the spherical aberration. On the other hand, when the second type optical record medium is loaded, the spherical aberration of the focused reading light due to the difference in the distances from the surfaces to the information record planes between the first and second type optical record media is corrected by the correction device. Namely, when the second type record medium is loaded, the optimum focus condition can be obtained by virtue of the correction device for correcting the spherical aberration. Finally, the reflection light of the focused reading light from the information record plane of either one of the first and second optical record media is received by the light receiving device. Consequently, the optimum reproduction can be performed with respect to either one of the first and second type optical record media, according to the first optical pickup apparatus of the present invention.

In one aspect of the first optical pickup apparatus of the present invention, the correction device is provided with: a correction element for correcting the spherical aberration when the correction element is placed in an optical path of the emitted reading light between the light emission device and the objective lens; and a moving device for selectively moving the correction element into the optical path and out of the optical path in accordance with a disc identification signal, which is inputted from the external and indicates the type of the loaded one of the first and second optical record media. According to this aspect, the spherical aberration is corrected by the correction element when the second optical record medium is loaded, since the correction element is placed in the optical path at this event by virtue of the moving device which moves the correction element in accordance with the disc identification signal. The disc identification signal is inputted from the external e.g. from a disc identification apparatus of the present invention as described later. Thus, on the basis of the disc identification signal, the optimum reproduction operation can be performed.

In another aspect of the first optical pickup apparatus of the present invention, the first optical pickup apparatus is further provided with a first optical element for guiding the emitted reading light from the light emission device to the objective lens when the first optical element is placed at a predetermined optical position in an optical path between the light emission device and the objective lens. The correction device is provided with: a second optical element for guiding the emitted reading light from the light emission device to the objective lens and for correcting the spherical aberration when the second optical element is placed at the predetermined optical position; and an exchanging device for exchanging the first and second optical elements to each other such that the first optical element is placed at the predetermined optical position when the first type optical record medium is loaded and that the second optical element is placed at the predetermined optical position when the second type optical record medium is loaded, in accordance with a disc identification signal, which is inputted from the external and indicates the type of the loaded one of the first and second optical record media. According to this aspect, the spherical aberration is corrected by the second optical element when the second optical record medium is loaded, since the second optical element is placed in the optical path at this event by virtue of the exchanging device which exchanges the first and second optical element in accordance with the disc identification signal. Thus, on the basis of the disc identification signal, the optimum reproduction operation can be performed.

In this aspect, the first optical element may be provided with a first collimator lens for collimating the emitted reading light, and the second optical element may be provided with a second collimator lens for collimating the emitted reading light and for correcting the spherical aberration. Thus, the spherical aberration can be certainly corrected by use of the collimator lens.

In another aspect of the first optical pickup apparatus of the present invention, the light emission device is provided with at least first and second light sources for emitting first and second reading lights respectively. The first optical pickup apparatus is further provided with a first optical element for guiding the first reading light from the first light source to the objective lens. The correction device is provided with: a second optical element for guiding the second reading light from the second light source to the objective lens and for correcting the spherical aberration; and a driving device for selectively driving the first and second light sources to emit the first and second reading lights respectively such that the first light source emits the first reading light when the first type optical record medium is loaded and that the second light source emits the second reading light when the second type optical record medium is loaded, in accordance with a disc identification signal, which is inputted from the external and indicates the type of the loaded one of the first and second optical record media. According to this aspect, the spherical aberration is corrected by the second optical element when the second optical record medium is loaded, since the second light source is driven to emit the second reading light at this event by virtue of the driving device which selectively drives the first and second light sources in accordance with the disc identification signal. Thus, on the basis of the disc identification signal, the optimum reproduction operation can be performed.

In this aspect, the driving device may be provided with: a first driving circuit for driving the first light source; a second driving circuit for driving the second light source; and a driving control circuit for controlling the first and second light sources to selectively emit the first and second reading lights respectively, in accordance with the disc identification signal. Thus, a reliable operation of driving the light sources can be performed. Alternatively, the driving device may be provided with: a driving circuit for driving one of the first and second light sources, which is electrically connected with the driving circuit; and a switching device for electrically connecting the driving circuit to the first light source when the first type optical record medium is loaded and electrically connecting the driving circuit to the second light source when the second type optical record medium is loaded, in accordance with the disc identification signal. Thus, by use of just one driving circuit, a plurality of light sources can be driven, so that the size and cost of the optical pickup apparatus can be reduced.

In this aspect, the first optical pickup apparatus may be further provided with a beam splitter disposed between the light emission device and the objective lens for combining optical paths of the first and second reading lights respectively emitted from the first and second light sources. Thus, two optical paths can be exactly combined by use of a relatively simple construction. Alternatively, the first optical pickup apparatus may be further provided with a half mirror disposed between the light emission device and the objective lens for combining optical paths of the first and second reading lights respectively emitted from the first and second light sources.

Further, in this aspect, the first optical element may be provided with a first collimator lens for collimating the first reading light, and a second collimator lens for collimating the second reading light and for correcting the spherical aberration. Thus, the spherical aberration can be certainly corrected by use of the collimator lens.

The above mentioned first object of the present invention can be also achieved by a second optical pickup apparatus for an information reproducing apparatus adapted to reproduce one of at least first and second type optical record media which is loaded on the information reproducing apparatus. The first and second type optical record media have information pits, which sizes are different from each other, and record tracks, on which the information pits are arranged respectively. The second optical pickup apparatus is provided with: a light emission device for emitting a reading light; an objective lens for focusing the emitted reading light onto the information record plane of the loaded one of the first and second type optical record media such that a light intensity distribution in a tangential direction of the record track of the focused reading light is optimum with respect to the first type optical record medium; a correction device for correcting the light intensity distribution in the tangential direction of the focused reading light with respect to the second type optical record medium due to a difference in the sizes of the information pits between the first and second type optical record media when the second type optical record medium is loaded; and a light receiving device for receiving a reflection light of the focused reading light from the information record plane of the loaded one of the first and second optical record media.

According to the second optical pickup apparatus, the reading light is emitted by the light emission device. Then, the emitted reading light is focused onto the information record plane of the loaded optical record medium by the objective lens, such that the light intensity distribution in the tangential direction of the focused reading light is optimum with respect to the first type optical record medium. Thus, when the first type optical record medium is loaded, the optimum light intensity distribution in the tangential direction can be obtained without the necessity of the correction device for correcting the light intensity distribution. On the other hand, when the second type optical record medium is loaded, the light intensity distribution in the tangential direction of the focused reading light due to the difference in the distances from the surfaces to the information record planes between the first and second type optical record media is corrected by the correction device. Namely, when the second type record medium is loaded, the optimum light intensity distribution can be obtained by virtue of the correction device for correcting the light intensity distribution as if the numerical aperture of the objective lens were adjusted to the size of the information pit of the second type optical record medium. Finally, the reflection light of the focused reading light from the information record plane of either one of the first and second optical record media is received by the light receiving device. Consequently, the optimum reproduction can be performed with respect to either one of the first and second type optical record media, according to the second optical pickup apparatus of the present invention.

In one aspect of the second optical pickup apparatus, the correction device is provided with: a correction element for correcting the light intensity distribution when the correction element is placed in an optical path of the emitted reading light between the light emission device and the objective lens; and a moving device for selectively moving the correction element into the optical path and out of the optical path in accordance with a disc identification signal, which is inputted from the external and indicates the type of the loaded one of the first and second optical record media. According to this aspect, the light intensity distribution is corrected by the correction element when the second optical record medium is loaded, since the correction element is placed in the optical path at this event by virtue of the moving device which moves the correction element in accordance with the disc identification signal. Thus, on the basis of the disc identification signal, the optimum reproduction operation can be performed.

In another aspect of the second optical pickup apparatus, the correction device is provided with a slit plate having a light cutting plate formed with a slit for shadowing both edge portions of the emitted reading light in the tangential direction by the light cutting plate and for transmitting a central portion of the emitted reading light in the tangential direction through the slit. Thus, by use of a rather simple construction, the light intensity distribution in the tangential direction of the record track can be corrected, and the optimum reproduction operation can be performed.

In another aspect of the second optical pickup apparatus, the correction device is provided with a glass filter having a glass plate and coating layers formed on both edge portions of a surface of the glass plate such that both edge portions of the emitted reading light in the tangential direction are shadowed by the coating layers and that a central portion of the emitted reading light in the tangential direction is transmitted through a portion of the glass plate between the coating layers. Thus, by use of a rather simple construction, the light intensity distribution in the tangential direction of the record track can be corrected, and the optimum reproduction operation can be performed.

In another aspect of the second optical pickup apparatus, the correction device is provided with a glass plate and gratings formed on both edge portions of a surface of the glass plate such that both edge portions of the emitted reading light in the tangential direction are transmitted through the gratings and that a central portion of the emitted reading light in the tangential direction is transmitted through a portion of the glass plate between the gratings. Thus, by use of a rather simple construction, the light intensity distribution in the tangential direction of the record track can be corrected, and the optimum reproduction operation can be performed.

In another aspect of the second optical pickup apparatus, the correction device is provided with: a liquid crystal shutter which is fixed in an optical path between the light emission device and the objective lens for shutting both edge portions of the emitted reading light in the tangential direction such that a central portion of the emitted reading light in the tangential direction is transmitted therethrough when the liquid crystal shutter is electrically driven to shut; and a liquid crystal driving device for electrically driving the liquid crystal shutter when the second type optical record medium is loaded. Thus, since the driving mechanism for moving the correction element is not necessary, the construction of the optical pickup apparatus can be made simplified and the size of the optical pickup apparatus can be reduced.

In another aspect of the second optical pickup apparatus, the correction device is disposed on one of a grating, a half mirror, a collimator lens and the objective lens which are arranged in an optical path from the light emission device to the loaded one of the first and second optical record media. Thus, since the separate correction element is not installed, the construction of the optical pickup apparatus can be made simplified and the size of the optical pickup apparatus can be reduced.

The above mentioned second object of the present invention can be achieved by an identification apparatus for identifying a type of optical record medium loaded on an information reproducing apparatus among at least first and second type optical record media which have distances from surfaces to information record planes different from each other. The information reproducing apparatus is provided with: an objective lens for focusing a reading light onto the information record plane of the loaded optical record medium; and a focus coil for driving the objective lens in a focusing direction. The identification apparatus is provided with: a detection device for detecting a voltage corresponding to a current, which flows through the focus coil when a focusing condition is optimum, and outputting a voltage signal indicating the detected voltage; a low pass filter for passing a low frequency component of the voltage signal and outputting a low frequency component signal; and a comparison device for comparing a voltage of the low frequency component signal with at least one standard voltage, which is set in advance based on the distances from the surfaces to the information record planes of the first and second optical record media, and for outputting an disc identification signal, which indicates the type of the loaded optical record medium, on the basis of a result of comparing.

According to the identification apparatus of the present invention, the voltage corresponding to a current, which flows through the focus coil when a focusing condition is optimum, is detected and outputted as the voltage signal by the detection device. Then, the low frequency component of the voltage signal is passed or extracted and outputted as the low frequency component signal by the low pass filter. Then, the voltage of the low frequency component signal is compared with the standard voltage by the comparison device, and the disc identification signal is finally outputted by the comparison device on the basis of the result of comparing. Since the standard voltage is set in advance based on the distances from the surfaces to the information record planes of the first and second optical record media, and since the voltage detected by the detection device corresponds to the current, which flows through the focus coil when the focusing condition is optimum, the types of optical record media which have distances from surfaces to information record planes different from each other can be easily and reliably identified according to the identification apparatus of the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a table for explaining an operation of the first embodiment;

FIG. 5 is a table for explaining an operation of the second embodiment;

DETAILED DESCRIPTION OF THE PREFERRED EMBODIMENTS

Referring to the accompanying drawings, embodiments of the present invention will be now explained.

Figure 1:
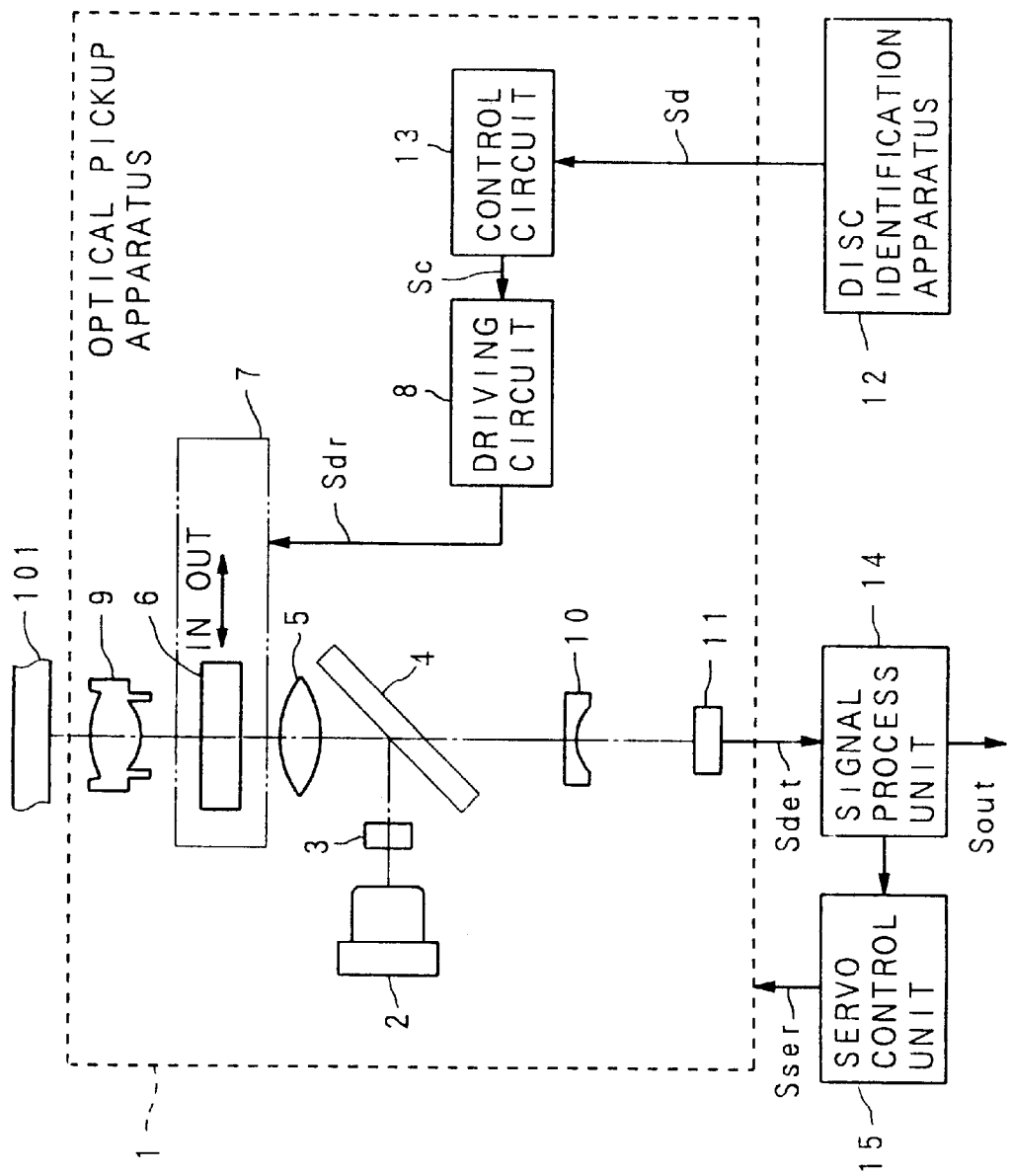
FIG. 1 is a block diagram of an optical pickup apparatus as a first embodiment of the present invention.

(1) First Embodiment:

FIG. 1 shows a construction of an optical pickup apparatus as a first embodiment, which is equipped in an optical disc player, of the present invention.

In FIG. 1, an optical pickup apparatus 1 is provided with: a semiconductor laser diode 2 for emitting a reading light; a grating 3 for separating the reading light into three beams; a half mirror 4 for reflecting and guiding the reading light from the laser diode 2 toward the side of an objective lens 9, and transmitting the reading light from the side of the objective lens 9 toward a light receiving element 11; a collimator lens 5 for converting the reading light which is a diffused light to a collimated light; a correcting element 6 for correcting the spherical aberration consisting of a spherical lens, a Fresnel lens, etc.; a driving mechanism 7 for moving the correction element 6; a driving circuit 8 for driving the driving mechanism 7 to move the correction element 6 into the optical path and move the correction element 6 out of the optical path, by outputting a driving control signal Sdr on the basis of a control signal Sc to the driving mechanism 7; the objective lens 9 for condensing and focusing the reading light onto an optical disc 101; a concave lens 10 for shaping the reading light, which is transmitted from the objective lens 9 through the half mirror 4; and the light receiving element 11 for receiving the reading light shaped by the concave lens 10, converting it to an electrical signal and outputting it as a detection signal Sdet.

The optical disc player is provided with a disc identifying sensor 12, as one example of a disc identification apparatus, for identifying the type of the optical disc 101 and outputting a disc identification signal Sd indicating the identified type of the optical disc 101.

The optical pickup apparatus 1 is further provided with a control circuit 13 for generating the control signal Sc for controlling the moving in and out operation of the correction element 6 on the basis of the disc identification signal Sd.

The optical disc player is further provided with: a signal process unit 14 for performing a predetermined signal process of the detection signal Sdet from the light receiving element 11, and a servo control unit 15 for performing servo controls such a focus servo control, a tracking servo control, a spindle servo control, etc., by generating servo control signals Sser on the basis of the signal processed by the signal process unit 14.

The three lights separated by the grating 3 are applied onto one record track of the optical disc 101 to form three light spots arranged along one record track and slightly spaced from each other so as to allow the optical pickup apparatus 1 to use one of the reflection lights from those three light spots which is in the best optical condition among the three reflection lights.

Here, a construction of the disc identifying sensor 12 is explained with referring to FIG. 2.

The disc identifying sensor 12 is provided with: a low pass filter 12A for passing only a low frequency component of the electric current flowing through a focus coil, which drives the objective lens 9 in the direction of focusing, and outputting it as a low frequency component signal having a voltage Vdc; and a comparator 12B for comparing the voltage Vdc of the low frequency component signal with a standard voltage Vref, and generating the disc identification signal Sd based on the result of the comparison.

Figure 2A:
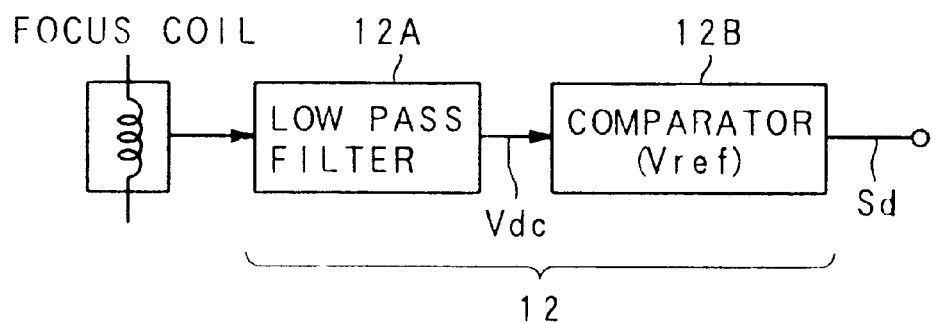
FIG. 2A is a block diagram of a disc identifying sensor used for the optical pickup apparatus of FIG. 1.
Figure 2B:
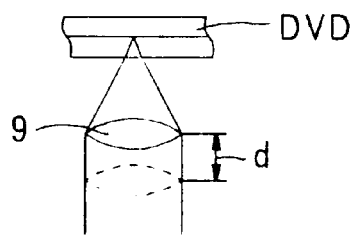
FIG. 2B is a diagram explaining a stroke with respect to the DVD in the optical pickup apparatus of FIG. 1.
Figure 2C:
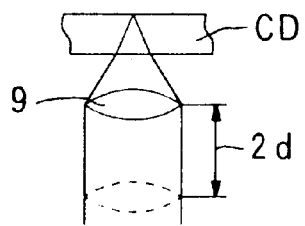
FIG. 2C is a diagram explaining a stroke with respect to the CD in the optical pickup apparatus of FIG. 1.

In case of identifying two types of optical discs, one of which is the DVD (Digital Video Disc) made by bonding two discs each having the protection layer (substrate) thickness of 0.6 mm as shown in FIG. 2B, and the other of which is the CD (Compact Disc) having the protection layer thickness of 1.2 mm as shown in FIG. 2C, the voltage Vdc of the low frequency component signal corresponding to the protection layer thickness of 0.9 mm (=(0.6+1.2)/2 mm) is set as the standard voltage Vref in the disc identifying sensor 12, for example.

Since the protection layer of the optical disc has a refraction coefficient n, a stroke (driving distance) d of the objective lens 9 is substantially proportional to "t/n" in case that the incident angle of the light beam is relatively small, wherein t represents the thickness of the protection layer. Thus, assuming that the focus position is at the surface of the protection layer when the focus servo is not performed, the driving distance d of the objective lens 9 when the focus servo is closed with respect to the DVD as shown in FIG. 2B, and the driving distance 2d of the objective lens 9 when the focus servo is closed with respect to the CD as shown in FIG. 2C, are different from each other by two times (=1.2/0.6 times).

Therefore, by adjusting the focus position to be at the surface of the protection layer when the focus servo is not performed, the disc identifying sensor 12 outputs the disc identification signal Sd, which indicates that the identified disc type is the CD, if the voltage Vmdc obtained as the voltage Vdc of the low frequency component signal exceeds the standard voltage Vref, and outputs the disc identification signal Sd, which indicates that the identified disc type is the DVD if the voltage Vmdc does not exceeds the standard voltage Vref.

In the explanations hereinbelow, the standard voltage Vref is set as the above explained manner.

Nextly, the operation of the optical pickup apparatus 1 will be described with referring to FIGS. 1 to 3.

In advance of the information reproduction operation, the optical pickup apparatus 1 closes the focus servo to get the reading light focused on the information record plane of the optical disc 101.

By this, the low pass filter 12A passes only the low frequency component of the voltage signal corresponding to the electric current flowing through the focus coil for driving the objective lens 9 in the focusing direction, and outputs it as the low frequency component signal having the voltage Vdc to the comparator 12B in FIG. 2A. By this, the comparator 12B compares the voltage Vdc of the low frequency component signal with the standard voltage Vref and outputs the disc identification signal Sd corresponding to the identified type of the optical disc 101, which is loaded on the optical disc player in FIG. 2A.

More concretely, if the voltage Vmdc obtained as the voltage Vdc of the low frequency component signal exceeds the standard voltage Vref, the disc identifying sensor 12 outputs the disc identification signal Sd, which indicates that the identified disc type is the CD, to the control circuit 13.

If the voltage Vmdc does not exceeds the standard voltage Vref, the disc identifying sensor 12 outputs the disc identification signal Sd, which indicates that the identified disc type is the DVD, to the control circuit 13.

By this, the control circuit 13 outputs the control signal Sc to the driving circuit 8 to control the moving in and out operation for the correction element 6 on the basis of the disc identification signal Sd in FIG. 1.

As a result, the driving circuit 8 outputs the driving control signal Sdr to the driving mechanism 7 on the basis of the control signal Sc, so as to move the correction element 6 into or out of the optical path in accordance with the disc identification signal Sd.

More concretely, it is assumed that the optical system of the optical pickup apparatus 1 is set to be suitable for the CD when the correction element 6 is not in the optical path. When the disc identification signal Sd indicates the CD, the correction element 6 is not moved if it is not in the optical path, and is moved out of the optical path if it is in the optical path, as shown in FIG. 3.

On the other hand, when the disc identification signal Sd indicates the DVD, the correction element 6 is moved into the optical path if it is in the optical path, and is not moved out if it is already in the optical path.

As described above in detail, according to the first embodiment, the type of the loaded optical disc is detected just by the difference in the thickness of the protection layer, and the optimum aberration correction is performed for the identified type of the optical disc, so that the optimum reproduction operation for the loaded optical disc can be easily performed.

In the above first embodiment, the explanation has been made for the case of identifying two types of the optical discs which protection layer thicknesses are different from each other (i.e. the CD and the DVD). However, it is possible to construct the optical pickup apparatus 1 such that a plurality of standard voltages may be set for the comparator 12B, more than two types of the optical discs may be identified and a plurality of correction elements are exchanged in accordance with the identified types of the optical discs.

Figure 4:
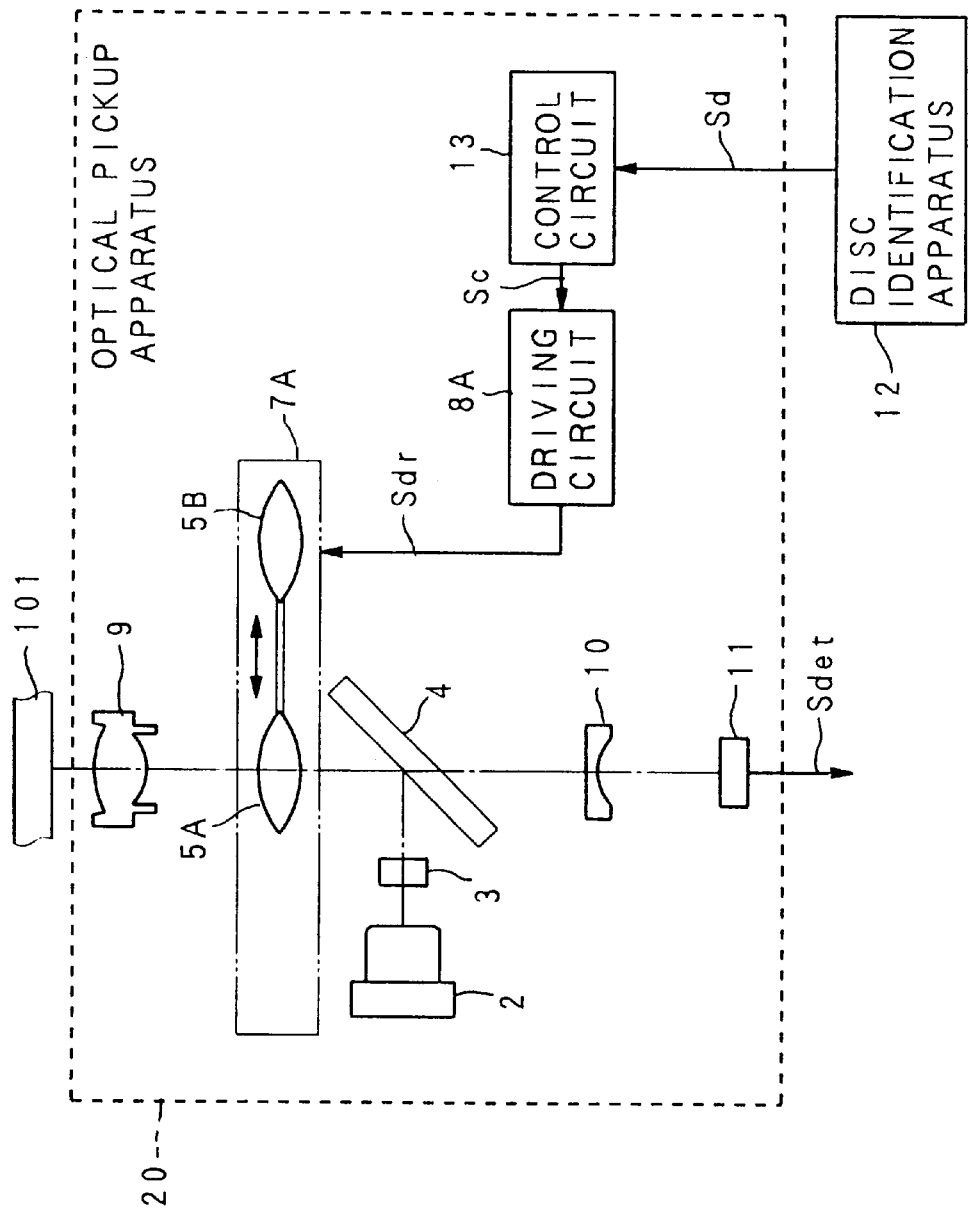
FIG. 4 is a block diagram of an optical pickup apparatus as a second embodiment of the present invention.

(2) Second Embodiment:

FIG. 4 shows a construction of an optical pickup apparatus as a second embodiment, which is equipped in an optical disc player, of the present invention. In FIG. 4, constitutional elements same as those in the first embodiment of FIG. 1 carry the same reference numerals and the explanation thereof are omitted. In the second embodiment, it is assumed that two types of optical discs i.e. the CD and the DVD are loaded on the optical disc player.

In FIG. 4, an optical pickup apparatus 20 is provided with: a semiconductor laser diode 2 for emitting a reading light; a grating 3 for separating the reading light into three beams; a half mirror 4 for reflecting and guiding the reading light from the laser diode 2 toward the side of an objective lens 9, and transmitting the reading light from the side of the objective lens 9 toward a light receiving element 11; a first collimator lens 5A having an optical parameter suitable for the CD for converting the reading light which is a diffused light to a collimated light; a second collimator lens 5B having an optical parameter suitable for the DVD for converting the reading light which is a diffused light to a collimated light; a driving mechanism 7A for the first and second collimator lenses 5A and 5B; a driving circuit 8A for driving the driving mechanism 7A to exchange the first and second collimator lenses 5A and 5B with respect to the optical path, by outputting a driving control signal Sdr on the basis of a control signal Sc to the driving mechanism 7A; the objective lens 9 for condensing and focusing the reading light onto an optical disc 101; a concave lens 10 for shaping the reading light, which is transmitted from the objective lens 9 through the half mirror 4; a light receiving element 11 for receiving the reading light shaped by the concave lens 10, converting it to an electrical signal and outputting it; and a control circuit 13 for generating the control signal Sc for controlling the exchanging operation of the first and second collimator lenses 5A and 5B on the basis of the disc identification signal Sd. The optical disc player is provided with: a disc identifying sensor 12 for identifying the type of the optical disc 101 and outputting a disc identification signal Sd indicating the identified type of the optical disc 101, which has the same construction as that explained in the first embodiment by use of FIGS. 2A to 2C.

Nextly, the operation of the optical pickup apparatus 20 will be described with referring to FIGS. 2A, 4 and 5.

In advance of the information reproduction operation, the optical pickup apparatus 20 closes the focus servo to get the reading light focused on the information record plane of the optical disc 101.

By this, the low pass filter 12A passes only the low frequency component of the voltage signal corresponding to the electric current flowing through the focus coil for driving the objective lens 9 in the focusing direction, and outputs it as the low frequency component signal having the voltage Vdc to the comparator 12B in FIG. 2A. By this, the comparator 12B compares the voltage Vdc of the low frequency component signal with the standard voltage Vref and outputs the disc identification signal Sd corresponding to the identified type of the optical disc 101, which is loaded on the optical disc player in FIG. 2A.

By this, the control circuit 13 outputs the control signal Sc to the driving circuit 8A to control the exchanging operation for the first and second collimator lenses 5A and 5B on the basis of the disc identification signal Sd in FIG. 4.

As a result, the driving circuit 8A outputs the driving control signal Sdr to the driving mechanism 7A on the basis of the control signal Sc, so as to exchange the first and second collimator lenses 6A and 6B in accordance with the disc identification signal Sd.

More concretely, it is assumed that the optical system of the optical pickup apparatus 20 is set to be suitable for the CD when the first collimator lens 5A is placed in the optical path. When the disc identification signal Sd indicates the CD, the first collimator lens 5A is not exchanged and remains as it is if the first collimator lens 5A is already placed in the optical path, and the second collimator lens 5B is exchanged to the first collimator lens 5A if the second collimator lens 5B is placed in the optical path, as shown in FIG. 5.

On the other hand, when the disc identification signal Sd indicates the DVD, the first collimator lens 5A is exchanged to the second collimator lens 5B if the first collimator lens 5A is placed in the optical path, and the second collimator lens 5B is not exchanged and remains as it is if the second collimator lens 5B is already placed in the optical path.

As described above in detail, according to the second embodiment, the type of the loaded optical disc is detected just by the difference in the thickness of the protection layer, and the first or second collimator lens 5A or 5B, which is optimum for the loaded optical disc, is placed in the optical path, so that the optimum reproduction operation for the loaded optical disc can be easily performed.

In the above second embodiment, the explanation has been made for the case of identifying two types of the optical discs which protection layer thicknesses are different from each other (i.e. the CD and the DVD). However, it is possible to construct the optical pickup apparatus 20 such that more than two collimator lenses may be prepared, more than two types of the optical discs may be identified and the collimator lenses are exchanged in accordance with the identified types of the optical discs.

Further, in the above second embodiment, the explanation has been made for the case of exchanging the collimator lenses. However, it is also possible to construct the optical pickup apparatus 20 such that other optical elements having different optical parameters may be exchanged.

(3) Third Embodiment:

In the first and second embodiments, the number of the reading light emitting optical system is just one. In a third embodiment, two reading light emitting optical systems are provided.

Figure 6:
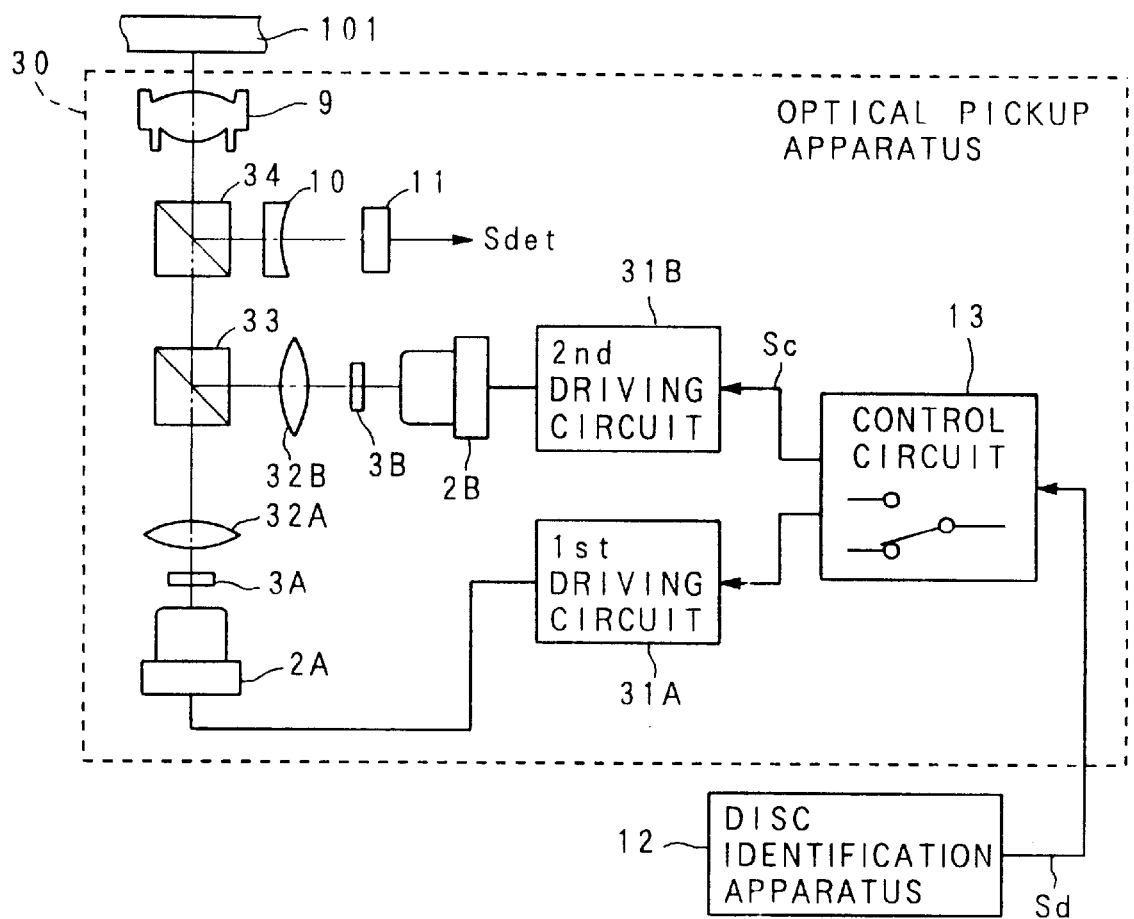
FIG. 6 is a block diagram of an optical pickup apparatus as a third embodiment of the present invention.

FIG. 6 shows a construction of an optical pickup apparatus as a third embodiment, which is equipped in an optical disc player, of the present invention. In FIG. 6, constitutional elements same as those in the first embodiment of FIG. 1 carry the same reference numerals and the explanation thereof are omitted. In the second embodiment, it is assumed that two types of optical discs i.e. the CD and the DVD are loaded on the optical disc player.

In FIG. 6, an optical pickup apparatus 30 is provided with: a first semiconductor laser diode 2A for emitting a reading light; a first driving circuit 31A for driving the first laser diode 2A; a first grating 3A for separating the reading light from the first laser diode 2A into three beams, a first collimator lens 32A for converting the reading light, which is a diffused light from the first laser diode 2A and has optical parameters suitable for the CD, to a collimated light; a second semiconductor laser diode 2B for emitting a reading light; a second driving circuit 31B for driving the second laser diode 2B; a second grating 3B for separating the reading light from the second laser diode 2B into three beams; a second collimator lens 32B for converting the reading light, which is a diffused light from the second laser diode 2B and has optical parameters suitable for the DVD, to a collimated light; a first beam splitter 33 for transmitting the reading light from the first collimator lens 32A and reflecting the reading light from the second collimator lens 32B; a second beam splitter 34 for transmitting the reading light from the first beam splitter 33 toward the objective lens 9 and reflecting the reading light from the objective lens 9 toward a light receiving element 11; the objective lens 9 for condensing and focusing the reading light onto an optical disc 101; a concave lens 10 for shaping the reading light, which is transmitted from the objective lens 9 and reflected by the second beam splitter 34; the light receiving element 11 for receiving the reading light shaped by the concave lens 10, converting it to an electrical signal and outputting it; and a control circuit 13 for generating the control signal Sc to selectively control the first and second driving circuits 31A and 31B to drive the respective laser diodes 2A and 28 on the basis of the disc identification signal Sd. The optical disc player is provided with a disc identifying sensor 12 for identifying the type of the optical disc 101 and outputting a disc identification signal Sd indicating the identified type of the optical disc 101, which has the same construction as that explained in the first embodiment by use of FIGS. 2A to 2C.

Nextly, the operation of the optical pickup apparatus 30 will be described with referring to FIGS. 2A and 6 to 7B.

In advance of the information reproduction operation, the optical pickup apparatus 30 closes the focus servo to get the reading light focused on the information record plane of the optical disc 101.

By this, the low pass filter 12A passes only the low frequency component of the voltage signal corresponding to the electric current flowing through the focus coil for driving the objective lens 9 in the focusing direction, and outputs it as the low frequency component signal having the voltage Vdc to the comparator 12B in FIG. 2A. By this, the comparator 12B compares the voltage Vdc of the low frequency component signal with the standard voltage Vref and outputs the disc identification signal Sd corresponding to the identified type of the optical disc 101, which is loaded on the optical disc player in FIG. 2A.

By this, the control circuit 13 selectively outputs the control signal Sc to either one of the first and second driving circuits 31A and 31B on the basis of the disc identification signal Sd in FIG. 6.

As a result, the selected driving circuit 31A or 31B drives the laser diode 2A or 2B on the basis of the control signal Sc, so as to enable the reproduction operation.

Figure 7A:
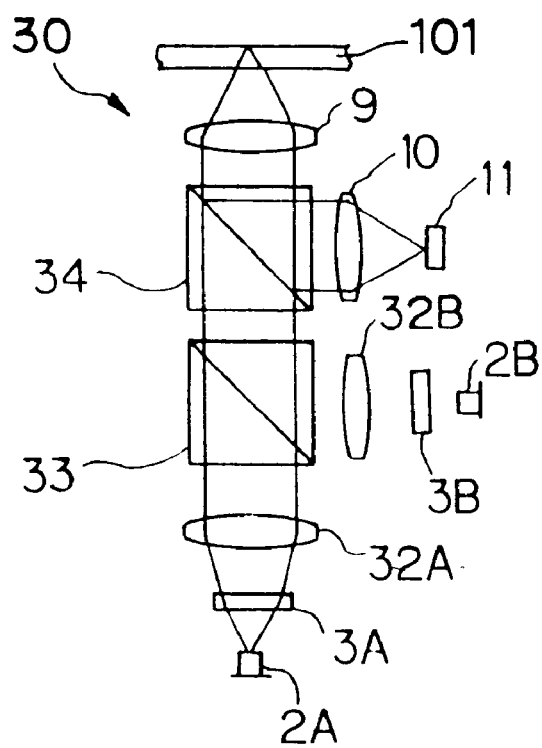
FIG. 7A is a block diagram of an optical system of the third embodiment in one state.
Figure 7B:
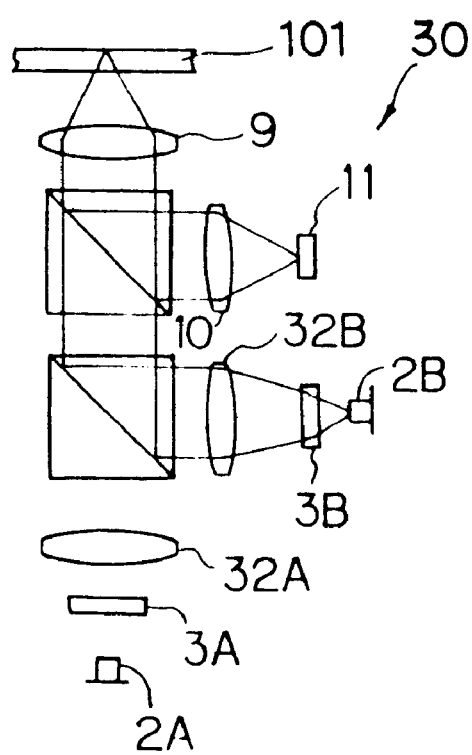
FIG. 7B is a block diagram of the optical system of the third embodiment in another state.

More concretely, it is assumed that the optical system of the optical pickup apparatus 30 is set to be suitable for the CD when the reading light is emitted from the first laser diode 2A and that the optical system of the optical pickup apparatus 30 is set to be suitable for the DVD when the reading light is emitted from the second laser diode 2R. When the disc identification signal Sd indicates the CD, the first driving circuit 31A is driven by the control circuit 13, so that the first laser diode 2A is driven to emit the reading light to perform the reproduction operation as shown in FIG. 7A. When the disc identification signal Sd indicates the DVD, the second driving circuit 31B is driven by the control circuit 13, so that the second laser diode 2B is driven to emit the reading light to perform the reproduction operation as shown in FIG. 7B.

As described above in detail, according to the third embodiment, the type of the loaded optical disc is detected just by the difference in the thickness of the protection layer, and the reading light emitting optical system is exchanged to be optimum one for the loaded optical disc, so that the optimum reproduction operation for the loaded optical disc can be easily performed.

In the above third embodiment, the explanation has been made for the case of identifying two types of the optical discs which protection layer thicknesses are different from each other (i.e. the CD and the DVD). However, it is possible to construct the optical pickup apparatus 30 such that more than two reading light emitting optical systems may be prepared, more than two types of the optical discs may be identified and the reading light emitting optical systems may be exchanged in accordance with the identified types of the optical discs.

(4) Fourth Embodiment:

In the third embodiment, two reading light emitting optical systems, each of which is provided with the driving circuit, are provided. In a fourth embodiment, the driving circuit is commonly used by two reading light emitting optical systems, so that the whole circuit construction be simplified.

Figure 8:
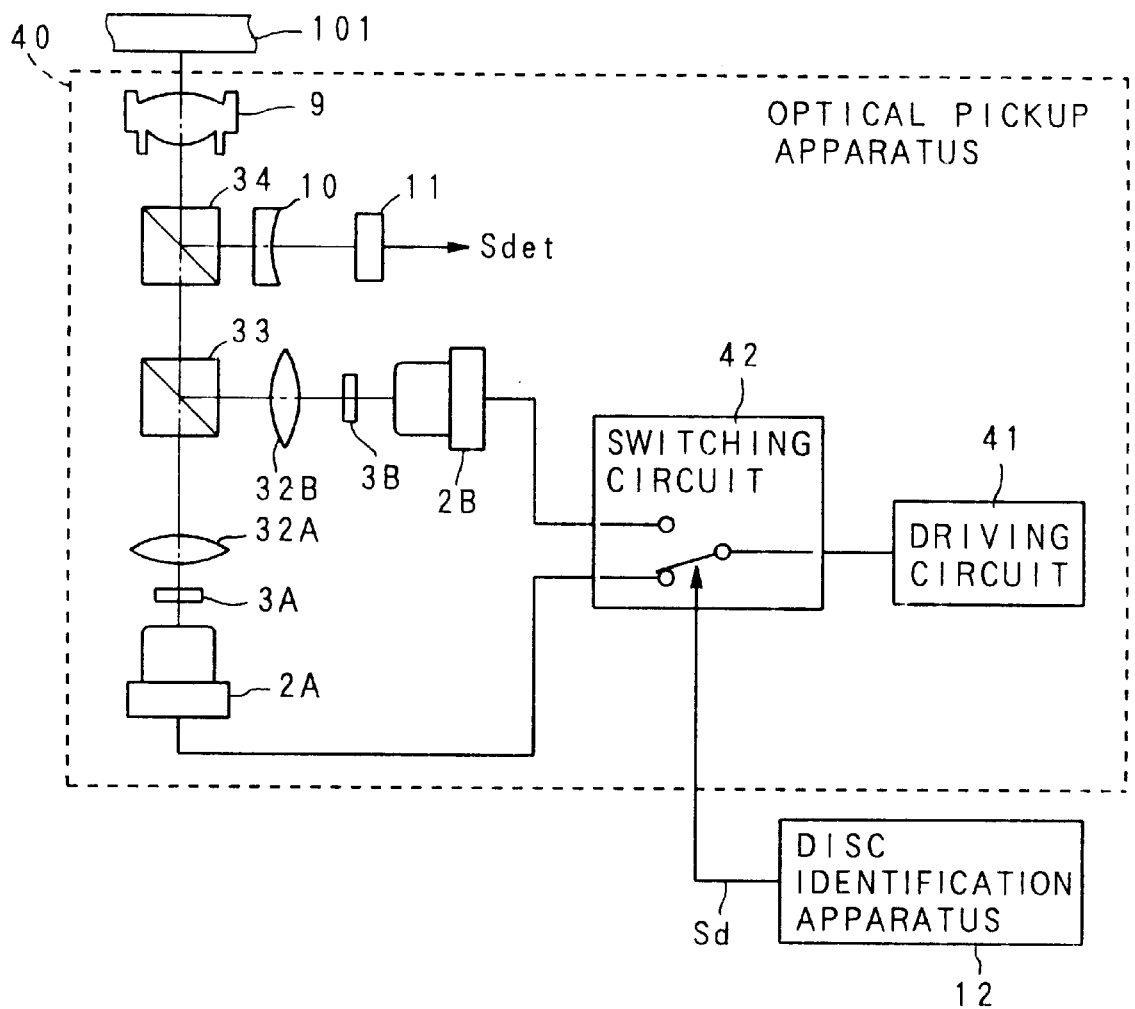
FIG. 8 is a block diagram of an optical pickup apparatus as a fourth embodiment of the present invention.

FIG. 8 shows a construction of an optical pickup apparatus as a fourth embodiment, which is equipped in an optical disc player, of the present invention. In FIG. 8, constitutional elements same as those in the third embodiment of FIG. 6 carry the same reference numerals and the explanation thereof are omitted. In the fourth embodiment, it is assumed that two types of optical discs i.e. the CD and the DVD are loaded on the optical disc player.

In FIG. 8, an optical pickup apparatus 40 is provided with: a first semiconductor laser diode 2A for emitting a reading light, a first grating 3A for separating the reading light from the first laser diode 2A into three beams; a first collimator lens 32A for converting the reading light, which is a diffused light from the first laser diode 2A and has optical parameters suitable for the CD, to a collimated light; a second semiconductor laser diode 2B for emitting a reading light; a driving circuit 41 for driving the first laser diode 2A or the second laser diode 2B; a second grating 3B for separating the reading light from the second laser diode 2B into three beams; a second collimator lens 32B for converting the reading light, which is a diffused light from the second laser diode 2B and has optical parameters suitable for the DVD, to a collimated light; a first beam splitter 33 for transmitting the reading light from the first collimator lens 32A and reflecting the reading light from the second collimator lens 32B; a second beam splitter 34 for transmitting the reading light from the first beam splitter 33 toward the objective lens 9 and reflecting the reading light from the objective lens 9 toward a light receiving element 11; the objective lens 9 for condensing and focusing the reading light onto an optical disc 101; a concave lens 10 for shaping the reading light, which is transmitted from the objective lens 9 and reflected by the second beam splitter 34; the light receiving element 11 for receiving the reading light shaped by the concave lens 10, converting it to an electrical signal and outputting it; and a switching circuit 42 for selectively connecting the driving circuit 41 to the first laser diode 2A or the second laser diode 2B in accordance with the disc identification signal Sd. The optical disc player is provided with a disc identifying sensor 12 for identifying the type of the optical disc 101 and outputting a disc identification signal Sd indicating the identified type of the optical disc 101, which has the construction same as that explained in the first embodiment by use of FIGS. 2A to 2C.

Nextly, the operation of the optical pickup apparatus 40 will be described with referring to FIGS. 2A and 8.

In advance of the information reproduction operation, the optical pickup apparatus 40 closes the focus servo to get the reading light focused on the information record plane of the optical disc 101.

By this, the low pass filter 12A passes only the low frequency component of the voltage signal corresponding to the electric current flowing through the focus coil for driving the objective lens 9 in the focusing direction, and outputs it as the low frequency component signal having the voltage Vdc to the comparator 12B in FIG. 2A. By this, the comparator 12B compares the voltage Vdc of the low frequency component signal with the standard voltage Vref and outputs the disc identification signal Sd corresponding to the identified type of the optical disc 101, which is loaded on the optical disc player in FIG. 2A.

By this, the switching circuit 42 selectively supplies a laser driving signal from the driving circuit 41 to the first laser diode 2A or the second laser diode 2B in accordance with the disc identification signal Sd in FIG. 8.

As a result, the selected laser diode 2A or 2B is driven so as to enable the reproduction operation.

More concretely, it is assumed that the optical system of the optical pickup apparatus 40 is set to be suitable for the CD when the reading light is emitted from the first laser diode 2A and that the optical system of the optical pickup apparatus 40 is set to be suitable for the DVD when the reading light is emitted from the second laser diode 2B. When the disc identification signal Sd indicates the CD, the driving circuit 41 drives the first laser diode 2A through the switching circuit 42 to emit the reading light to perform the reproduction operation. When the disc identification signal Sd indicates the DVD, the driving circuit 41 drives the second laser diode 2B through the switching circuit 42 to emit the reading light to perform the reproduction operation.

As described above in detail, according to the fourth embodiment, the type of the loaded optical disc is detected just by the difference in the thickness of the protection layer, and the reading light emitting optical system, which is optimum for the loaded optical disc, is driven through the switching circuit 42, so that the optimum reproduction operation for the loaded optical disc can be easily performed.

In the above fourth embodiment, the explanation has been made for the case of identifying two types of the optical which protection layer thicknesses are different from each other (i.e. the CD and the DVD). However, it is possible to construct the optical pickup apparatus 40 such that more than two laser diodes may be prepared, more than two types of the optical discs may be identified and the laser diodes may be switched over in accordance with the identified types of the optical discs.

Figure 9A:
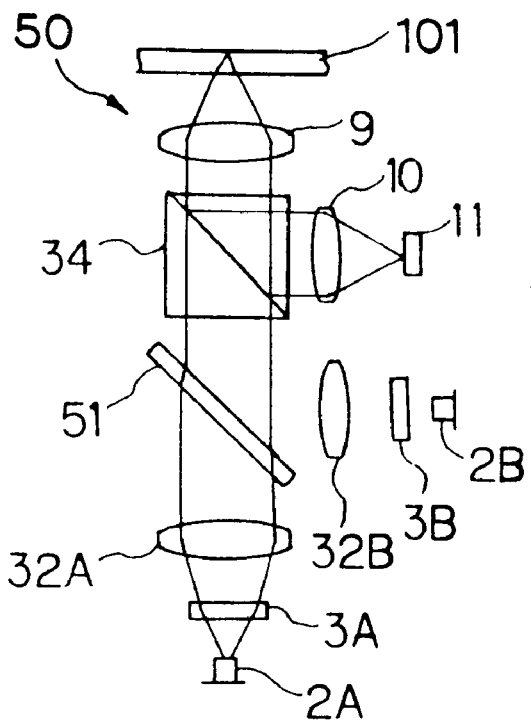
FIG. 9A is a block diagram of an optical system of a fifth embodiment of the present invention in one state.
Figure 9B:
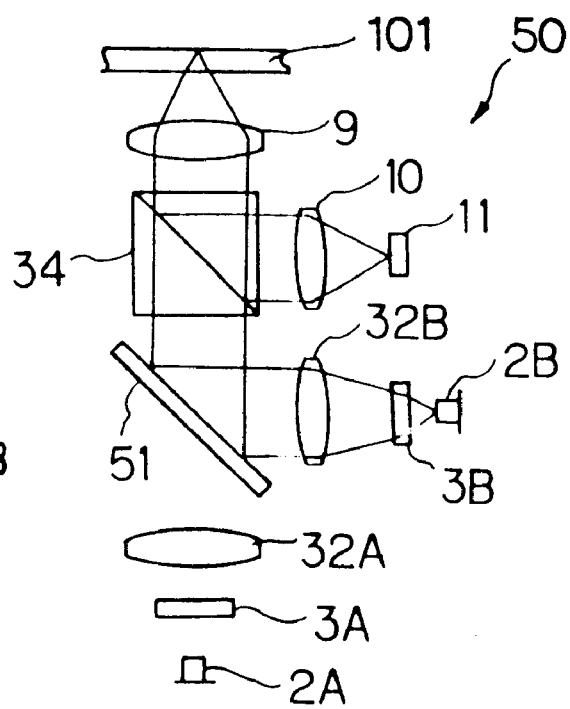
FIG. 9B is a block diagram of the optical system of the fifth embodiment in another state.

(5) Fifth Embodiment:

Each of FIGS. 9A and 9B shows a construction of a reading light emitting optical system of an optical pickup apparatus 50 as a fifth embodiment, which is equipped in an optical disc player, of the present invention. In FIGS. 9A and 9B, constitutional elements same as those in the third embodiment of FIGS. 7A and 7B carry the same reference numerals and the explanation thereof are omitted.

The point of the optical pickup apparatus 50 of FIGS. 9A and 9B different from the third embodiment of FIGS. 7A and 7B is that a half mirror 51 is provided in place of the first beam splitter 33. Other constitutional elements and the operation of the optical pickup apparatus 50 are the same as those of the third embodiment.

According to the fifth embodiment, the type of the loaded optical disc is detected just by the difference in the thickness of the protection layer, and the reading light emitting optical system is exchanged to be optimum for the loaded optical disc, so that the optimum reproduction operation for the loaded optical disc can be easily performed in the same manner as the third embodiment.

Figure 10:
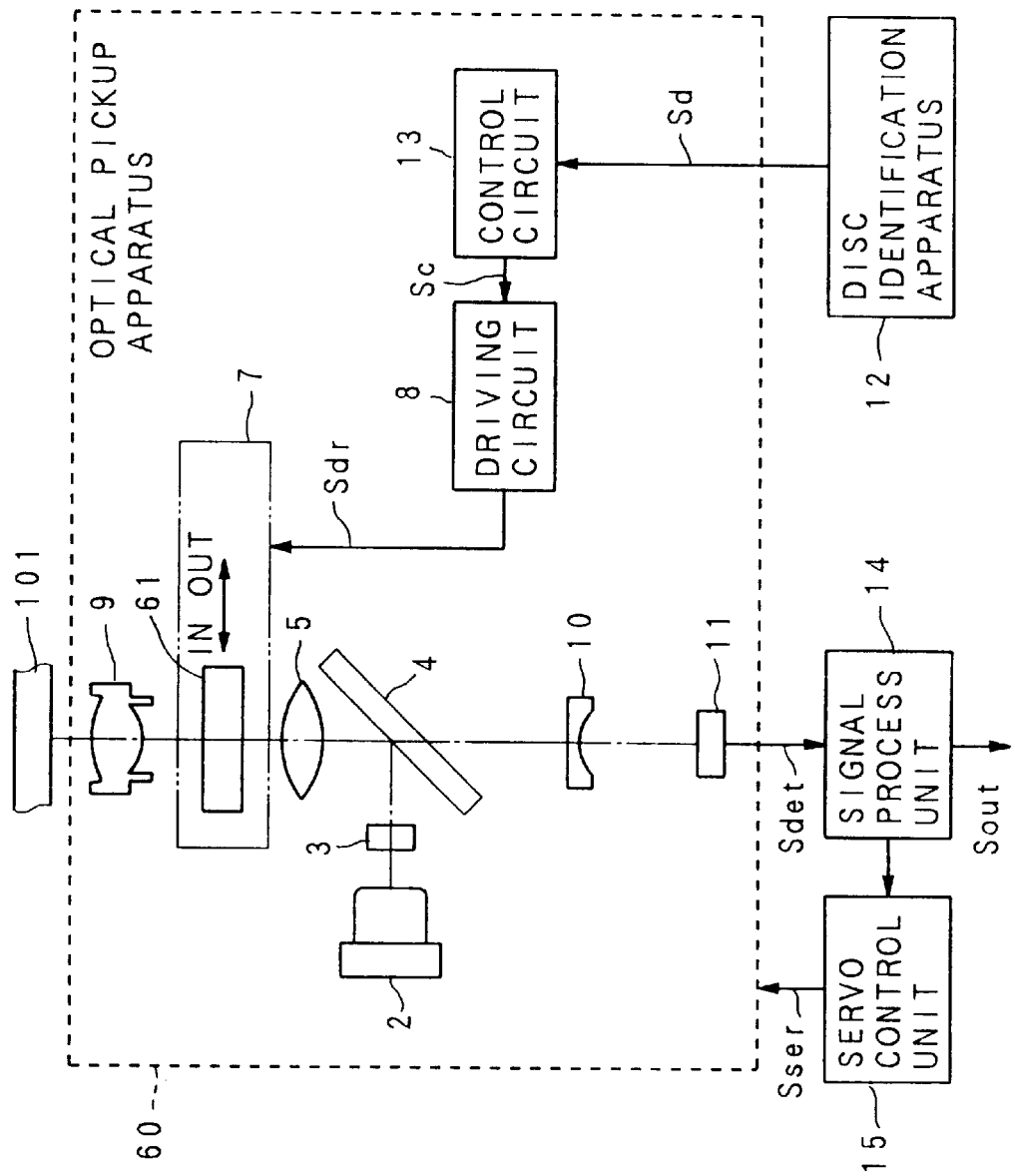
FIG. 10 is a block diagram of an optical pickup apparatus as a sixth embodiment of the present invention.

(6) Sixth Embodiment:

FIG. 10 shows a construction of an optical pickup apparatus as a sixth embodiment, which is equipped in an optical disc player, of the present invention. In FIG. 10, constitutional elements same as those in the first embodiment of FIG. 1 carry the same reference numerals and the explanation thereof are omitted.

As shown in FIG. 10, the construction of an optical pickup apparatus 60 is different from that of the first embodiment of FIG. 1 in that a slit plate 61 for correcting a light intensity distribution in the tangential direction of the record track i.e. the disc rotation direction of the optical disc 101 is provided in place of the correction element 6 for correcting the spherical aberration in the first embodiment. The slit plate 61 is driven by the driving mechanism 7 to move into and out of the optical path. Other constitutional elements of the sixth embodiment are the same as those of the first embodiment.

Nextly, the operation of the optical pickup apparatus 60 will be described with referring to FIGS. 2A and 10 to 14.

In advance of the information reproduction operation the optical pickup apparatus 60 closes the focus servo to get the reading light focused on the information record plane of the optical disc 101.

By this, the low pass filter 12A passes only the low frequency component of the voltage signal corresponding to the electric current flowing through the focus coil for driving the objective lens 9 in the focusing direction, and outputs it as the low frequency component signal having the voltage Vdc to the comparator 12B in FIG. 2A. By this, the comparator 12B compares the voltage Vdc of the low frequency component signal with the standard voltage Vref and outputs the disc identification signal Sd corresponding to the identified type of the optical disc 101, which is loaded on the optical disc player in FIG. 2A.

In this case, it is assumed that the DVD is constructed to have a record track pitch smaller than that of the CD, and also have an information pit size smaller than that of the CD, so as to improve the information record density, and that the numerical aperture of the objective lens 9 is set to be optimum for the reproduction of the DVD.

By this, the control circuit 13 outputs the control signal Sc to the driving circuit 8 to control the moving in and out operation for the slit plate 61 on the basis of the disc identification signal Sd.

As a result, the driving circuit 8 outputs the driving control signal Sdr to the driving mechanism 7 on the basis of the control signal Sc, so as to move the slit plate 61 into and out of the optical path in accordance with the disc identification signal Sd.

Figure 11:
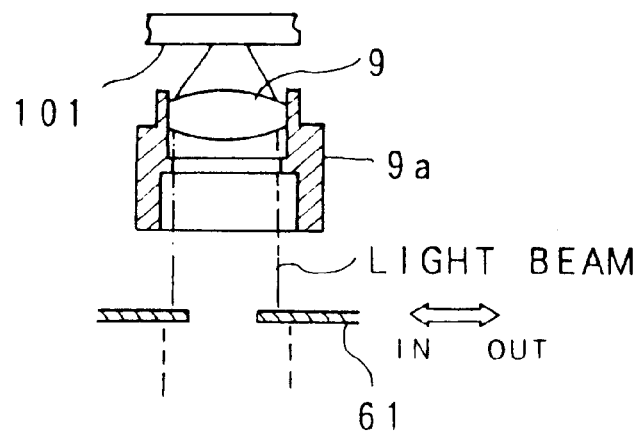
FIG. 11 is a partial cross sectional view of a slit plate, an actuator movable member and an objective lens in an optical pickup apparatus of the sixth embodiment.

More concretely, in the same manner as the first embodiment shown in FIG. 3, when the disc identification signal Sd indicates the CD, the slit plate 61 is moved into the optical path if the slit plate 61 is not in the optical path, and is not moved but remains as it is if the slit plate 61 is already in the optical path as shown in FIG. 11. In FIG. 11, the objective lens 9 is actuated in the focusing direction by an actuator movable member 9a, and the slit plate 61 prescribes the width of the reading light incident to the objective lens 9 by the plate portion around the slit.

Figure 12:
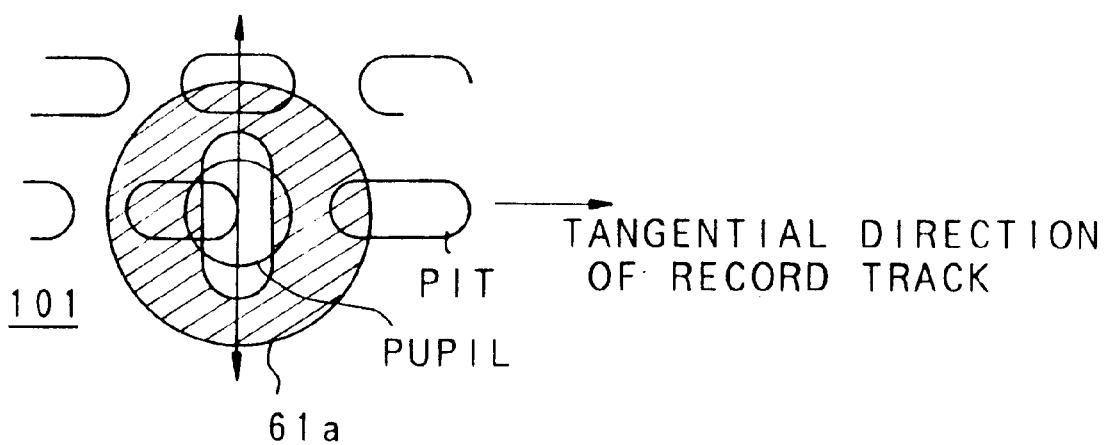
FIG. 12 is a magnified partial plan view of an optical disc in the sixth embodiment.
Figure 13:
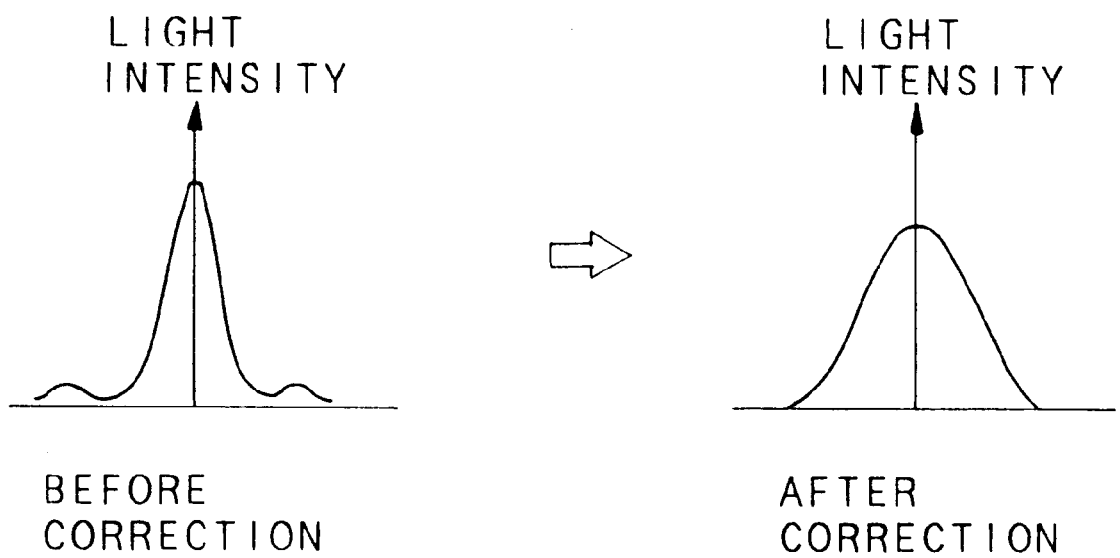
FIG. 13 is a diagram for explaining the correction in a light intensity distribution according to the sixth embodiment.
Figure 14:
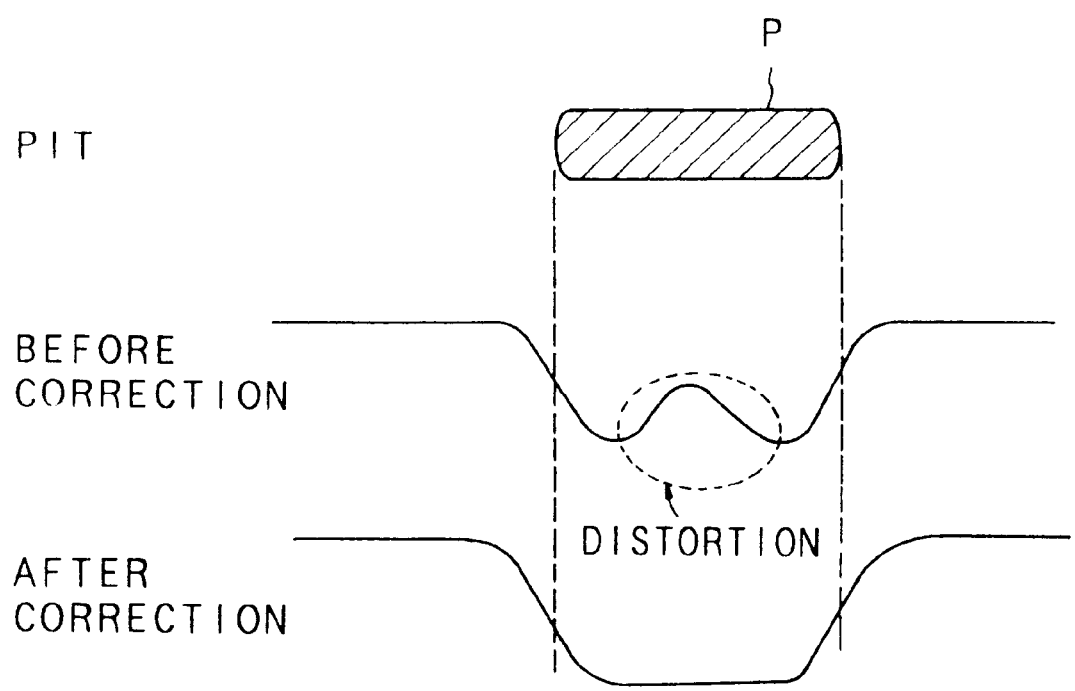
FIG. 14 is another diagram for explaining the correction in the light intensity distribution according to the sixth embodiment.

As a result, as shown in FIG. 12, the both edge portions of the pupil of the reading light beam, which is applied onto the optical disc 101, in the tangential direction of the record track, is shadowed by the slit plate 61 as indicated by a shaded area 61a on the optical disc 101. Thus, the light intensity distribution in the tangential direction of the record track upon reproducing the CD is corrected as shown in FIG. 13. At this time, as shown in FIG. 14, the reproduction signal after correction can be obtained by the reflection light from an information pit P, such that the distortion which would exists without the slit plate 61 is certainly corrected by the slit plate 61, according to the sixth embodiment.

On the other hand, when the disc identification signal Sd indicates the DVD, the slit plate 61 is not moved but remains as it is if the slit plate 61 is not in the optical path, and is moved out of the optical path if the slit plate 61 is in the optical path.

As described above in detail, according to the sixth embodiment, the light intensity distribution correction optimum for each size of the information pit of the loaded optical disc is performed, so that the effect, which is substantially same as the case of correcting the numerical aperture NA of the objective lens, can be achieved. Thus, the optimum reproduction operation for the loaded optical disc can be easily performed.

In the above sixth embodiment, the explanation has been made for the case of reproducing two types of the optical discs which protection layer thicknesses are different from each other (i.e. the CD and the DVD). However, it is possible to construct the optical pickup apparatus 60 such that a plurality of standard voltages are set to the comparator 12B of the disc identifying sensor 12, more than two types of the optical discs may be identified and a plurality of slit plates are exchanged in accordance with the identified types of the optical discs to perform the reproduction operation optimum for each optical disc.

Figure 15:
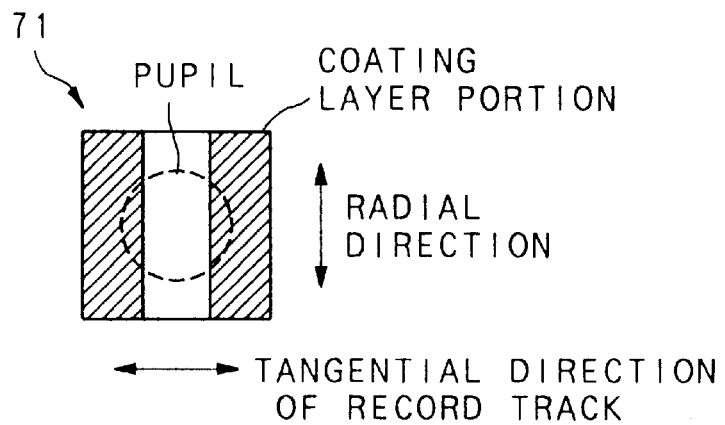
FIG. 15 is a plan view of a glass filter used in a seventh embodiment of the present invention.

(7) Seventh Embodiment:

In the above sixth embodiment, the slit plate 61 is used for correcting the light intensity distribution. In a seventh embodiment of the present invention, a glass filter 71 shown in FIG. 15 for correcting the light intensity distribution is provided in place of the slit plate 61 in the construction shown in FIG. 10. As shown in FIG. 15, the glass filter 71 is constructed such that a coating layer is applied to both edge portions on a surface of a glass substrate so as to decrease the light transmissivity of the glass substrate at the edge portions thereof in the tangential direction of the record track. Other than that, the construction of the seventh embodiment is the same as the sixth embodiment.

According to the seventh embodiment, the light intensity distribution correction optimum for each size of the information pit of the loaded optical disc is performed, so that the effect, which is substantially same as the case of correcting the numerical aperture NA of the objective lens, can be achieved. Thus, the optimum reproduction operation for the loaded optical disc can be easily performed in the same manner as the sixth embodiment.

Figure 16:
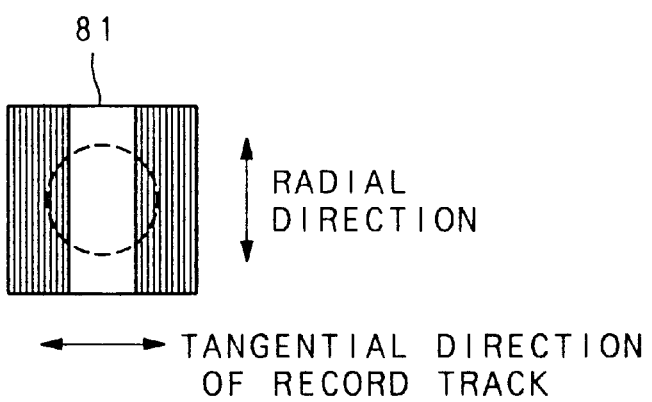
FIG. 16 is a plan view of a light intensity distribution correction element in an eighth embodiment of the present invention.

(8) Eight Embodiment:

In the above seventh embodiment, the glass filter 71 is used in place of the slit plate 61 in the construction of FIG. 10. In an eighth embodiment, a correction element 81 shown in FIG. 16 having gratings for correcting the light intensity distribution is used in place of the slit plate 61 of FIG. 10. As shown FIG. 16, the correction element 81 is constructed such that the gratings are provided at both edge portions of a glass substrate in the tangential direction of the record track of the optical disc 101. The grating direction of each grating of the correction element 81 is perpendicular to the tangential direction of the record track. Other than that, the construction of the eighth embodiment is the same as the sixth embodiment.

By use of the correction element 81 having the gratings in this manner, the intensity of the zero order light beam, which has passed through each grating at the edge portion, is lower than that of the light beam, which has passed through a central portion of the correction element 81. Accordingly, the effect, which is substantially same as the case of correcting the numerical aperture NA of the objective lens, can be achieved. Thus, the optimum reproduction operation for the loaded optical disc can be easily performed in the same manner as the sixth embodiment.

Figure 17:
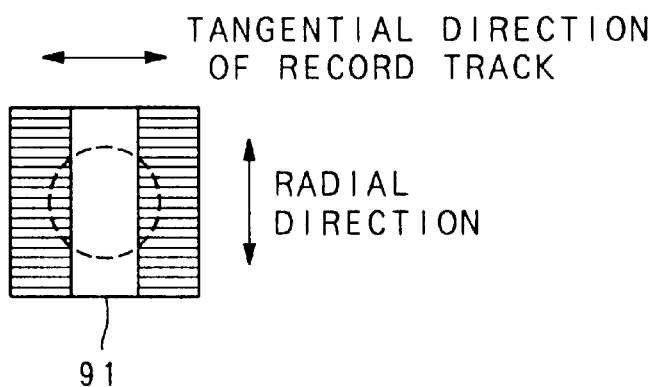
FIG. 17 is a plan view of a light intensity distribution correction element in a ninth embodiment of the present invention.

(9) Ninth Embodiment:

In the above eighth embodiment, the grating direction of each grating of the correction element 81 is perpendicular to the tangential direction of the record track of the optical disc 101. In a ninth embodiment of the present invention, the grating direction of each grating of a correction element 91 is parallel to the tangential direction of the record track as shown in FIG. 17. Other than that, the construction of the correction element 91 in the ninth embodiment is the same as the correction element 81 in the eighth embodiment. In fact, the grating direction for this kind of correction element 81 or 91 can be freely designed.

Figure 18:
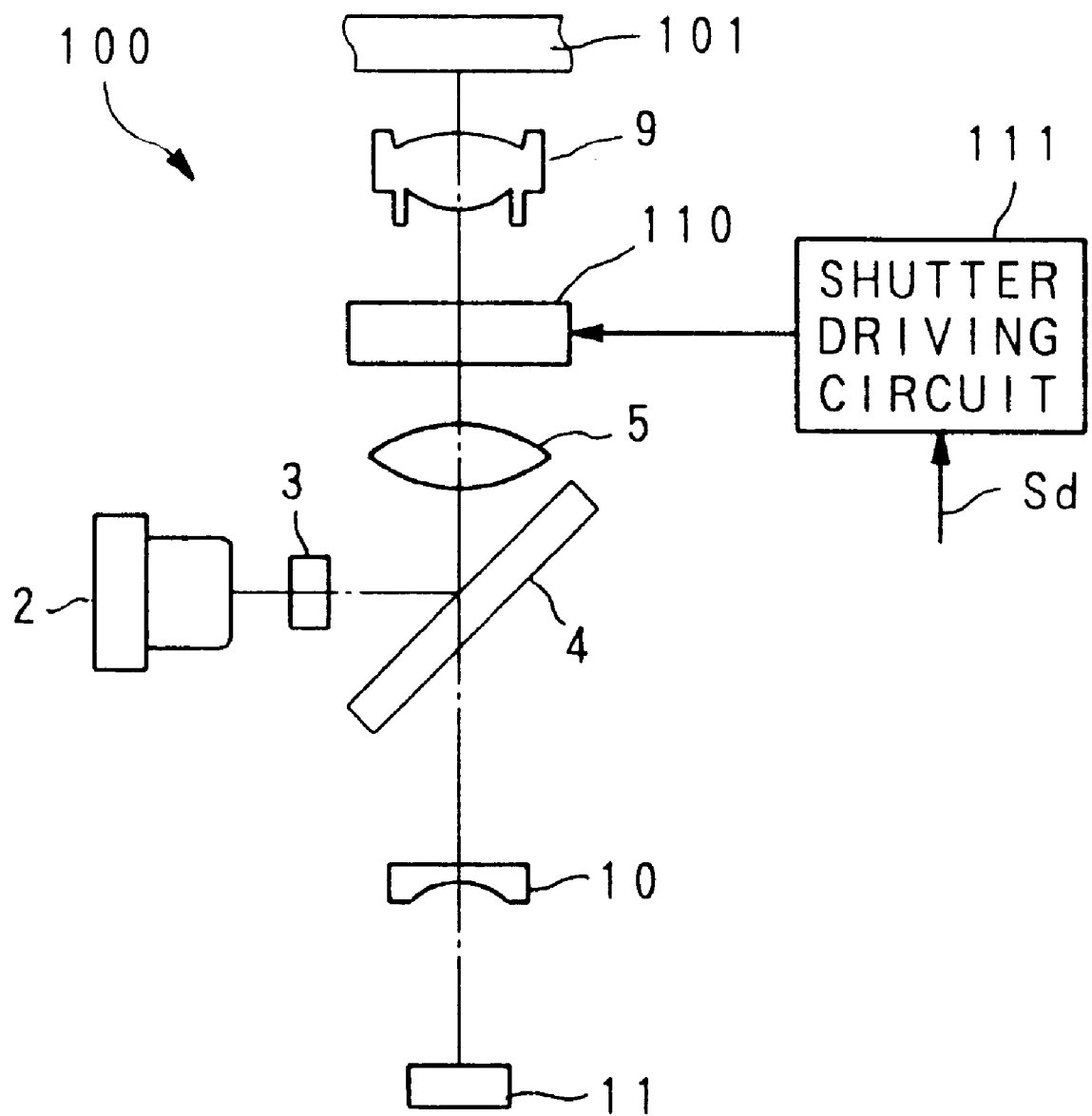
FIG. 18 is a block diagram of an optical system in a tenth embodiment of the present invention.

(10) Tenth Embodiment:

In each of the above described sixth to ninth embodiments, the correction of the light intensity distribution is performed by mechanically inserting an optical element i.e. the slit plate, the glass filter and the correction element having the grating into the optical path, so as to correct the light intensity distribution in the tangential direction of the record track. In contrast to this, an optical pickup apparatus 100 as a tenth embodiment is constructed such that a correction element consisting of a liquid crystal shutter 110, which light transmissive amount can be electrically controlled by a shutter driving circuit 111, is fixed in the optical path, as shown in FIG. 18. In FIG. 18, constitutional elements same as those in the sixth embodiment of FIG. 10 carry the same reference numerals and the explanation thereof are omitted.

In FIG. 18, the liquid crystal shutter 110 shuts both edge portions of the emitted reading light in the tangential direction of the record track such that a central portion of the emitted reading light in the tangential direction is transmitted through the liquid crystal shutter 110 when the liquid crystal shutter 110 is electrically driven by a shutter driving circuit 111 to shut. The shutter driving circuit 111 electrically drives the liquid crystal shutter 110 to shut in accordance with the disc identification signal Sd.

According to the tenth embodiment, in addition to the advantageous effect of the sixth embodiment, since the driving mechanism for the correction element is not necessary, the construction of the optical pickup apparatus 100 can be made simplified and the size of the optical pickup apparatus 100 can be made small.

Figure 19:
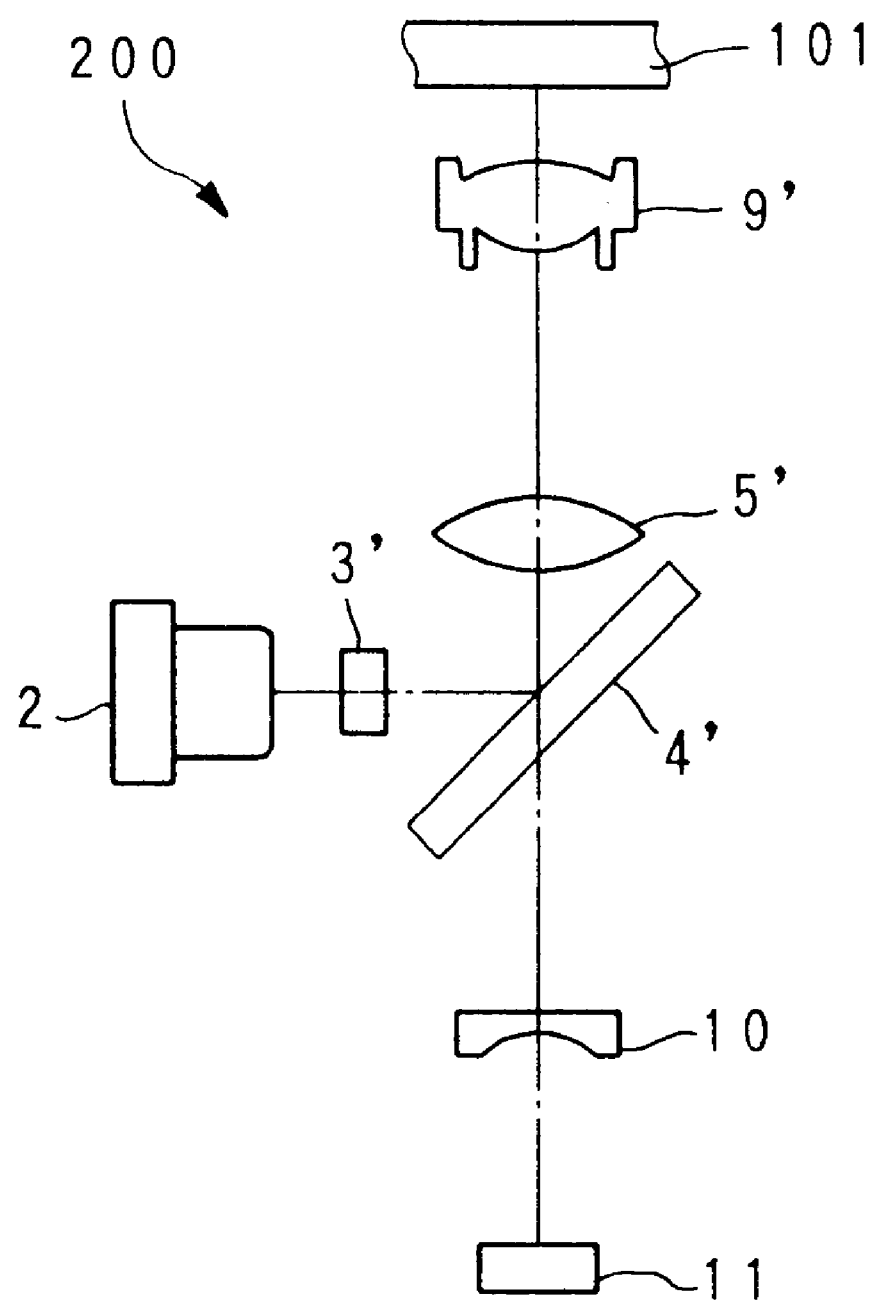
FIG. 19 is a block diagram of an optical system in an eleventh embodiment of the present invention.

(11) Eleventh Embodiment:

In each of the above described sixth to tenth embodiments, the correction of the light intensity distribution is performed by a separate optical element exclusive for correcting the light intensity distribution i.e. the slit plate, the glass filter, the correction element having the grating and the correction element electrically functioning as the correction element. In contrast to this, an optical pickup apparatus 200 as an eleventh embodiment is constructed such that a separate correction element does not exists. Instead, by applying the coating layer or by forming the gratings on one of the optical elements disposed in the optical path between the laser diode 2 and the optical disc 101 i.e. the grating 3', the half mirror 4', the collimator lens 5' and the objective lens 9', the correction element for correcting the light intensity distribution is formed in one body with this one of the optical elements. In FIG. 19, constitutional elements same as those in the sixth embodiment of FIG. 10 carry the same reference numerals and the explanation thereof are omitted. In FIG. 19, the optical element (the grating 3', the half mirror 4', the collimator lens 5' or the objective lens 9') formed in one body with the correction element is adapted to be exchanged, or electrically controlled so as to change the light transmissive property in the tangential direction of the record track in accordance with the identified type of the loaded optical disc 101.

According to the eleventh embodiment, in addition to the advantageous effect of the sixth embodiment, since the separate correction element is not installed, the construction of the optical pickup apparatus 200 can be made simplified and the size of the optical pickup apparatus 200 can be made small.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical pickup apparatus for an information reproducing apparatus adapted to reproduce one of at least first and second type optical record media loaded on said information reproducing apparatus, said first and second type optical record media having information pits, which sizes are different from each other, and record tracks, on which said information pits are arranged respectively, said optical pickup apparatus comprising:

light emission means for emitting a reading light;

an objective lens for focusing the emitted reading light onto the information record plane of said loaded one of said first and second type optical record media such that a light intensity distribution in a tangential direction of the record track of the focused reading light is optimum with respect to said first type optical record medium;

correction means for correcting the light intensity distribution in the tangential direction of the focused reading light with respect to said second type optical record medium due to a difference in the sizes of the information pits between said first and second type optical record media when said second type optical record medium is loaded; and light receiving means for receiving a reflection light of the focused reading light from the information record plane of said loaded one of said first and second optical record media and for outputting a light detection signal corresponding to the received reflection light, wherein said correction means corrects the light intensity distribution by restricting a width of the focused reading light in the tangential direction so as to correct the distortion of the outputted light detection signal when said second type optical record medium is loaded.

2. An optical pickup apparatus according to claim 1, wherein said correction means comprises:

a correction element for correcting the light intensity distribution when said correction element is placed in an optical path of the emitted reading light between said light emission means and said objective lens; and a moving means for selectively moving said correction element into the optical path and out of the optical path in accordance with a disc identification signal, which is inputted from the external and indicates the type of said loaded one of said first and second optical record media.

3. An optical pickup apparatus according to claim 1, wherein said correction means comprises a slit plate having a light cutting plate formed with a slit for shadowing both edge portions of the emitted reading light in the tangential direction by the light cutting plate and for transmitting a central portion of the emitted reading light in the tangential direction through the slit.

4. An optical pickup apparatus according to claim 1, wherein said correction means comprises a glass filter having a glass plate and coating layers formed on both edge portions of a surface of the glass plate such that both edge portions of the emitted reading light in the tangential direction are shadowed by the coating layers and that a central portion of the emitted reading light in the tangential direction is transmitted through a portion of the glass plate between the coating layers.

5. An optical pickup apparatus according to claim 1, wherein said correction means comprises a glass plate and gratings formed on both edge portions of a surface of the glass plate such that both edge portions of the emitted reading light in the tangential direction are transmitted through the gratings and that a central portion of the emitted reading light in the tangential direction is transmitted through a portion of the glass plate between the gratings.

6. An optical pickup apparatus according to claim 1, wherein said correction means comprises:

a liquid crystal shutter which is fixed in an optical path between said light emission means and said objective lens for shutting both edge portions of the emitted reading light in the tangential direction such that a central portion of the emitted reading light in the tangential direction is transmitted therethrough when the liquid crystal shutter is electrically driven to shut; and a liquid crystal driving means for electrically driving said liquid crystal shutter when the second type optical record medium is loaded.

7. An optical pickup apparatus according to claim 1, wherein said correction means is disposed on one of a grating, a half mirror, a collimator lens and the objective lens which are arranged in an optical path from said light emission means to said loaded one of said first and second optical record media.

\* \* \* \* \*